H. W. WIENKE.
DRAWBAR MOUNTING MACHINE.
APPLICATION FILED FEB. 9, 1920.

1,378,926.

Patented May 24, 1921.
2 SHEETS—SHEET 1.

Witnesses

Inventor
Herbert W. Wienke
By Charles E. Hill
Atty

H. W. WIENKE.
DRAWBAR MOUNTING MACHINE.
APPLICATION FILED FEB. 9, 1920.
1,378,926.
Patented May 24, 1921.
2 SHEETS—SHEET 2.
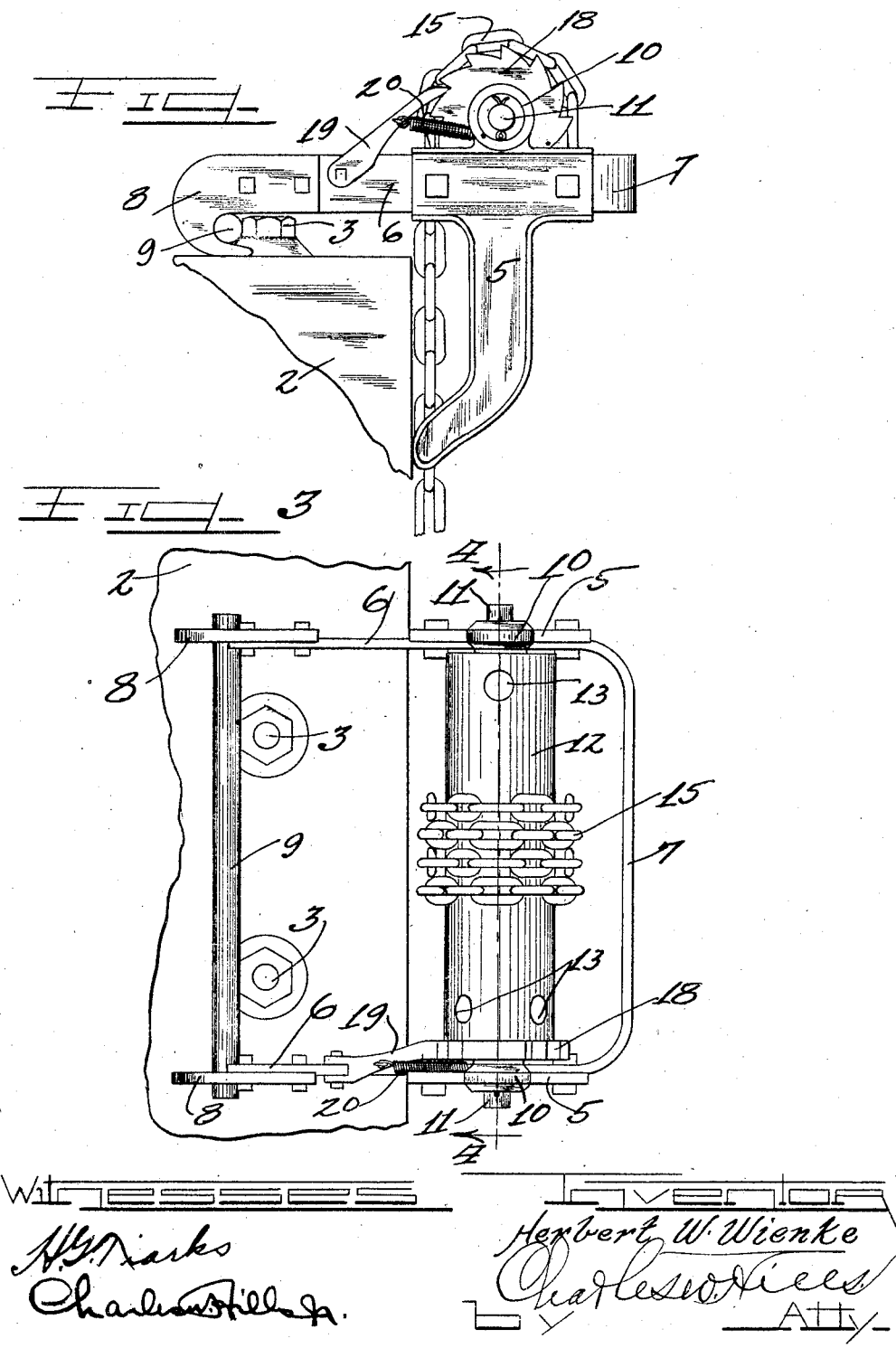

UNITED STATES PATENT OFFICE.

HERBERT W. WIENKE, OF MICHIGAN CITY, INDIANA.

DRAWBAR-MOUNTING MACHINE.

1,378,926.          Specification of Letters Patent.     Patented May 24, 1921.

Application filed February 9, 1920. Serial No. 357,160.

*To all whom it may concern:*

Be it known that I, HERBERT W. WIENKE, a citizen of the United States, and a resident of the city of Michigan City, in the county of Laporte and State of Indiana, have invented certain new and useful Improvements in Drawbar-Mounting Machines; and I do hereby declare that the following is a full, clear, and exact description of the same, reference being had to the accompanying drawings, and to the numerals of reference marked thereon, which form a part of this specification.

In the mounting of drawbars on freight cars considerable trouble is often experienced due to the weight of the drawbars which, during the mounting thereof, frequently slip and fall causing severe injuries to the persons trying to secure the drawbars in place.

This invention relates to an improved type of a drawbar mounting or hoisting machine adapted to be removably engaged on the deadhead of a freight car to facilitate hoisting of a drawbar into a position wherein the same may be readily secured in position for use, without endangering the person mounting the drawbar.

It is an object of this invention to provide a device adapted to be removably attached to the end of a freight car for hoisting a drawbar into position to permit mounting of the same.

It is also an object of the invention to provide a pawl and ratchet controlled hoisting device adapted to be engaged on the deadhead of a freight car for the purpose of elevating a drawbar into mounting position.

Another object of the invention is to provide a device whereby one person can conveniently mount a drawbar on a freight car without danger of incurring injury resulting from the slipping or dropping of the drawbar.

It is an important object of this invention to construct a drawbar hoisting device adapted to be conveniently attached to one end of a freight car or similar vehicle to facilitate mounting of the drawbar in position by one person if necessary.

Other and further important objects of this invention will be apparent from the disclosures in the drawings and specification.

The invention (in a preferred form) is illustrated in the drawings and hereinafter more fully described.

On the drawings:

Fig. 2 is an enlarged end view of the device.

Fig. 3 is a top plan view thereof.

As shown on the drawings:

Figure 1:
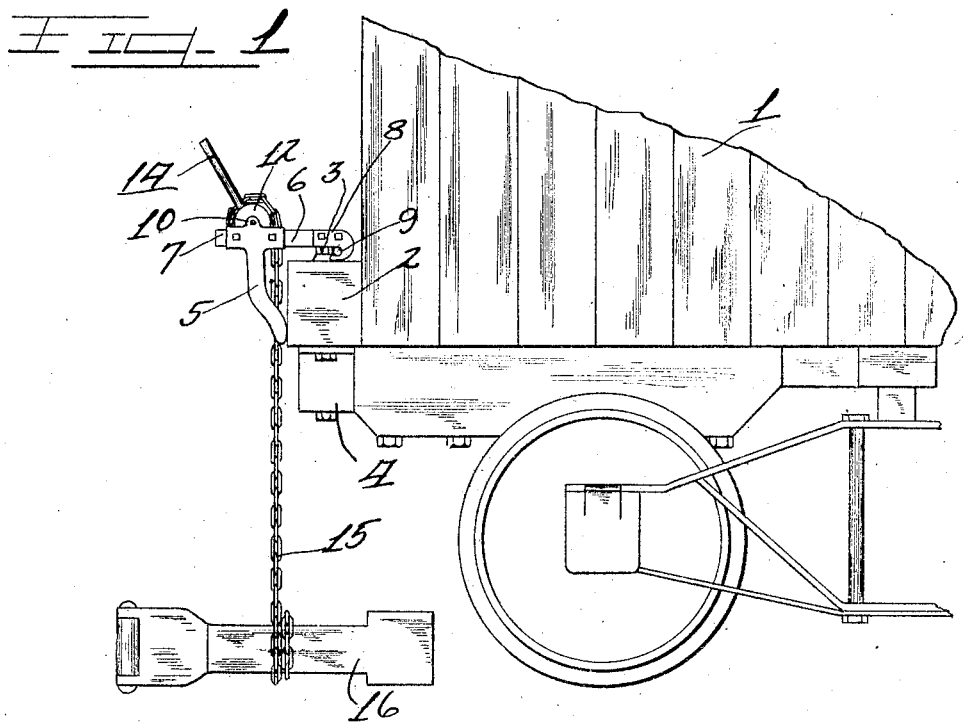
Figure 1 is a fragmentary side elevation of one end of a freight car showing a drawbar mounting device embodying the principles of this invention.

The reference numeral 1, indicates a freight car having rigidly secured transversely across the end thereof a deadhead or joist 2, provided with the customary bolts 3, for securing part of a car-coupling 4, in position.

Figs. 1 to 3 inclusive disclose a preferred form of the drawbar hoisting device which comprises a frame embracing a pair of oppositely positioned legs or brackets 5, rigidly connected to one another by means of a yoke. The yoke embraces two parallel arms or legs 6, connected together by a brace bar 7. The yoke arms extend beyond the legs 5, and have rigidly bolted or otherwise secured on the ends thereof attaching hooks 8, which are adapted to engage around a bar or rod 9, disposed upon the top of the freight car deadhead 2, and behind the heads of the bolts 3.

Integrally formed upon the upper ends of the legs 5, are bearings 10, for receiving trunnions 11, which are formed axially on the ends of a winding drum or cylinder 12. Each end of the drum 12, is provided with a plurality of openings 13, for receiving the end of a lever or handle bar 14, whereby the drum may be rotated to wind up a hoisting chain 15. One end of the chain 15, is attached to the drum while the other end is adapted to be wound around a drawbar 16, which is to be hoisted into position to permit mounting of the same in place upon the freight car. Formed at one end of the drum 12, is a hub, on which is keyed or otherwise secured a ratchet wheel 18. A pawl 19, has one end thereof pivotally attached to one of the arms 6, to permit the other end thereof to engage the toothed periphery of the ratchet wheel. A coiled spring 20, is provided, and has one end secured to the pawl 19, and the other end fastened to one of the bearings 10, for holding the pawl in engagement with the ratchet wheel.

The operation is as follows:

To mount a drawbar 16, on a freight car, the mounting machine is placed in position with the hooks 8, thereof engaged on the bar or rod 9, which seats behind the bolts 3, of the deadhead 2. The ends of the legs 5, contact the deadhead 2, and brace the yoke 7. The free end of the hoisting chain 15, is now engaged around the drawbar 16, and the lever or handle 14, is engaged in the openings 13, of the drum 12. By swinging the lever 14, outwardly the drum 12, is rotated thereby causing the hoisting chain 15, to be wound on said drum to elevate the drawbar 16, into a position whereby it may be conveniently secured in an operating position upon the freight car.

When the drawbar has been mounted, the chain 15, is released therefrom and the mounting machine is removed from the freight car deadhead 2. In winding up the chain 15, upon the drum 12, the ratchet wheel 18, rotates with the drum and is prevented from rotating in a reverse direction by the pawl 19, which is held in engagement with the toothed periphery of the ratchet wheel by the coiled spring 20. To permit unwinding of the hoisting chain 15, from the drum 12, the pawl 19, is manually removed from its engagement with the ratchet wheel, thereby permitting a reverse rotation of the drum 12.

I am aware that numerous details of construction may be varied through a wide range without departing from the principles of this invention, and I therefore do not purpose limiting the patent granted otherwise than necessitated by the prior art.

I claim as my invention:

1. The combination with a freight car and the deadhead and deadhead bolts thereof, of a rod adapted to be mounted on said deadhead behind said bolts, and a drawbar mounting machine adapted to removably engage said rod and contact said deadhead to afford a means for raising a drawbar into a position for attachment to said freight car.

2. The combination with a freight car and the deadhead and deadhead bolts thereof, of a rod adapted to be removably mounted on said deadhead behind said bolts, and a drawbar mounting machine comprising a frame, hooks thereon adapted to removably engage said rod, legs on said frame adapted to contact said deadhead to brace the frame in place, a drum rotatably supported on said frame, a flexible hoisting means attached to said drum, means for rotating the drum to cause said flexible hoisting means to be wound up on said drum, a ratchet wheel secured to said drum, a pawl on said frame, and a spring connected to said pawl and to said frame for holding the pawl in engagement with said ratchet wheel to permit rotation of said drum in one direction only.

In testimony whereof I have hereunto subscribed my name in the presence of two subscribing witnesses.

HERBERT W. WIENKE.

Witnesses:
EARL M. HARDINE,
FRED E. PAESLER.